US010154187B2

(12) United States Patent
Ruprecht et al.

(10) Patent No.: US 10,154,187 B2
(45) Date of Patent: Dec. 11, 2018

(54) APPARATUS AND METHOD FOR ADJUSTING AND / OR CALIBRATING A MULTI-CAMERA MODULE AS WELL AS THE USE OF SUCH AN APPARATUS

(71) Applicant: Trioptics GmbH, Wedel (DE)

(72) Inventors: Aiko Ruprecht, Hamburg (DE); Benjamin Stauss, Hamburg (DE); Johannes Spehling, Hamburg (DE)

(73) Assignee: Trioptics GmbH, Wedel (DE)

( * ) Notice: Subject to any disclaimer, the term of this patent is extended or adjusted under 35 U.S.C. 154(b) by 243 days.

(21) Appl. No.: 15/343,349

(22) Filed: Nov. 4, 2016

(65) Prior Publication Data

US 2017/0132774 A1    May 11, 2017

(30) Foreign Application Priority Data

Nov. 6, 2015 (EP) .................................... 15193508

(51) Int. Cl.
| | | |
|---|---|---|
| *H04N 13/00* | (2018.01) | |
| *H04N 5/225* | (2006.01) | |
| *G02B 27/30* | (2006.01) | |
| *H04N 17/00* | (2006.01) | |
| *H04N 13/246* | (2018.01) | |
| *H04N 13/239* | (2018.01) | |
| *H04N 5/369* | (2011.01) | |
| *H04N 13/243* | (2018.01) | |

(52) U.S. Cl.
CPC ........... *H04N 5/2258* (2013.01); *G02B 27/30* (2013.01); *H04N 13/239* (2018.05); *H04N 13/246* (2018.05); *H04N 17/002* (2013.01); *G06T 2207/10012* (2013.01); *H04N 5/369* (2013.01); *H04N 13/243* (2018.05)

(58) Field of Classification Search
CPC .... H04N 5/2258; H04N 5/369; H04N 13/239; H04N 13/246; H04N 13/243; H04N 17/002; G02B 27/30; G06T 2207/10012
USPC .......................................................... 348/47
See application file for complete search history.

(56) References Cited

U.S. PATENT DOCUMENTS

| | | | |
|---|---|---|---|
| 2010/0141962 A1 | 6/2010 | Lee et al. | |
| 2011/0026012 A1* | 2/2011 | Barth | ...................... F41G 7/004 356/51 |

(Continued)

FOREIGN PATENT DOCUMENTS

JP    2012132739 A    7/2012

OTHER PUBLICATIONS

Morel, Jerrat, "Autocollimator", https://fr.wikipedia.org/w/index.php?title=Lunette_autocollimatrice&oldid=116110952, Jun. 8, 2016, p. 1-2, Wikipedia.org.

*Primary Examiner* — Allen C Wong
(74) *Attorney, Agent, or Firm* — Rankin, Hill & Clark LLP

(57) ABSTRACT

An apparatus (10) and method for adjusting and/or calibrating a multi-camera module (2) having a plurality of cameras (4a, 4b). The apparatus (10) includes an optical arrangement for creating first virtual test structures (22) at an infinite distance and second test structures (26, 32) at a finite distance. Individual images (20a, 20b) captured with the cameras (4a, 4b) of the multi-camera module (2) include respectively the first and the second test structure (22, 26, 32). Based on the deviation of the position of the test structures (22, 26, 32) in the two individual images (20a, 20b), the cameras (4a, 4b) of the multi-camera module (2) are aligned relative to each other.

14 Claims, 11 Drawing Sheets

(56) References Cited

U.S. PATENT DOCUMENTS

2012/0293666 A1 11/2012 Wong et al.
2015/0138372 A1* 5/2015 Apel .................. G02B 27/62
                                                                  348/188
2016/0029009 A1* 1/2016 Lu .................... G01B 11/2545
                                                                  348/47

* cited by examiner

APPARATUS AND METHOD FOR ADJUSTING AND / OR CALIBRATING A MULTI-CAMERA MODULE AS WELL AS THE USE OF SUCH AN APPARATUS

BACKGROUND OF INVENTION

Field of Invention

The invention relates to an apparatus for adjusting and/or calibrating a multi-camera module having a plurality of cameras. Furthermore, the invention relates to the use of such an apparatus for adjusting and calibrating a multi-camera module as well as a method for adjusting and/or calibrating a multi-camera module having a plurality of cameras.

Brief Description of Related Art

Multi-camera modules are known in many different configurations and for various applications. Such modules comprise a plurality of cameras, often two cameras, which are distanced from each other by a stereo basis. The cameras of the multi-camera module capture an observation field made up of slightly different viewing directions or respective angles and capture together stereoscopic image data of the observation field, from which 3D data can be obtained.

Multi-camera modules are used, for example, in medical technology (3D endoscopes), in automobile technology (distance stereo cameras) or in the field of multi-media (3D cameras).

Some multi-camera modules comprise two or more completely separate camera modules. It is also known to design the imaging optics as separate components only, wherein the image sensors are combined, for example, into one assembly. The image sensors can thereby be arranged on separate components, for example separate printed circuit boards, or can also combined on one component, that is, for example, a common printed circuit board or die. There are modules in which the optics are combined in one component. Such systems are also called "one systems." Multi-camera modules can also be equipped with cameras or imaging optics, which capture different viewing angles, which have e.g. different focal lengths. With such modules, a very fast zoom is possible by switching from one camera to the other. In general, a trend is observed towards smaller camera systems having a smaller stereo basis.

In multi-camera modules, it is necessary to align the two individual cameras relative to each other. This necessity pertains to the alignment of the image sensors and/or to the alignment of the respective imaging optics. It is possible to align the cameras with respect to each other with parallel optical axes in that objects lying in infinity are detected by all cameras at the same pixel position. It is also possible to adjust the cameras to a finitely far away object so this object at a finite distance is detected by all cameras at the same pixel position. In this case, the optical axes of the cameras intersect at a finite distance.

For aligning the cameras, test systems for multi-camera modules are known in which real objects are used as test structures (often also referred to as test charts) at different finite distances, in order to adjust or to calibrate the cameras of the multi-camera module with respect to each other. Such a test system is known for example from Luo et al., Pub. No. US 2014/0118503 A1. Test structures are observed at two different finite distances. The two individual cameras are aligned with respect to each other in an iterative process.

However, for exact alignment of the cameras of a multi-camera module around all six axes, a finite distance measurement is not sufficient. A suitable combination of a measurement at finite distance and a measurement at infinite distance should be carried out in order to determine all six degrees of freedom separately from each other and in order to be able to correspondingly align the cameras.

Multiple large distances between the test sample and a test structure are used for the approximately infinite measurement. The distance between the test sample and the test structure is thus selected very large compared to the focal length of the test sample. However, such a structure needs a lot of space.

The sequential measurement processes also used multiple times, in which measurements are performed at different distances, require a long measurement time, which is also undesirable. A test system, in which individual measurements are performed sequentially with different measurement distances, i.e. in succession temporally, is known for example from Kazunari et al., JP 05 589 823 B2. In the apparatus known from this document, a test structure lying in infinity is simulated with the help of a collimator. A test structure at a finite distance is provided at a second separate measurement location. The test sample is placed on a rotating table and, depending on the position of the table, is subjected either to a finite or an infinite measurement.

It is an object of the invention to provide an apparatus as well as a method for adjusting and/or calibrating a multi-camera module as well as the use of such an apparatus, wherein the adjustment and/or calibration of the multi-camera module should be precise and efficient.

BRIEF SUMMARY OF THE INVENTION

The object is solved by an apparatus for adjusting and/or calibrating a multi-camera module having a plurality of cameras, comprising:

an optical arrangement for creating first virtual test structures at an infinite distance and second test structures at a finite distance, wherein the optical arrangement comprises at least one collimator, which is configured to create the first virtual test structures at an infinite distance through the imaging of a first graticule, and wherein the test structures are simultaneously detectable with the cameras of the multi-camera module, a processing unit for evaluating a picture of the first and second test structures captured with the multi-camera module, wherein the processing unit is configured to calculate an alignment of the cameras of the multi-camera module relative to each other from the captured picture, wherein the picture captured with the multi-camera module comprises an individual image per camera, and wherein each individual image images the first and the second test structures and the processing unit is further configured to calculate an alignment of the cameras relative to each other, in that positions of the test structures in the individual image of a camera are compared with positions of the corresponding test structures in the individual image of a further camera and deviations are calculated, and an adjusting and/or calibrating unit, which is configured to align said cameras relative to each other based on data relating to the alignment of the cameras of the multi-camera module and thereby adjusting and/or calibrating the multi-camera module.

In the context of the present description, a camera comprises an image sensor, for example a CCD or CMOS sensor, and an imaging optic, i.e. an imaging lens assembled of one or more lenses. The alignment of the cameras takes place through alignment of its image sensor and/or through an alignment of its imaging optics. In other words, it is provided that alternatively the imaging op-tics and/or the image sensor are shifted and/or tilted.

Different patterns are suitable as test structures. For example, suitable test structures are: an (if applicable rotated) cross, an H structure, an edge, a point, a reticle, a Siemens star, a checkerboard pattern. These patterns are present on the graticule(s) and are used to create the corresponding virtual test structures. The same applies to the real test structures mentioned further below, which can be made of the same patterns. Differing from the virtual patterns, the real test patterns are not created through projection, but are rather present, for ex-ample, on a map or a transparent plate illuminated from the rear side, which extend in one plane.

Just as with the adjusting and calibrating unit, the processing unit is also a PC, a workstation or the like. The adjusting and calibrating unit preferably comprises suitable actuators, with which the cameras of the multi-camera module can be aligned. Alternatively, actuators are used that are themselves present in the multi-camera module. Furthermore, it is provided in particular that the cameras, for example their image sensor and/or their imaging optic, are fixed after the adjustment and calibration have taken place. For this, it is provided, for example, that these are adhered to the housing of the multi-camera module.

It is provided, in particular, that the optical arrangement is configured to create the first and second test structures simultaneously. It is also provided to create these in succession temporally. Furthermore, each individual image includes, in particular, both test structures.

The apparatus for adjusting and/or calibrating the multi-camera module makes it advantageously possible to obtain the full information about the relative position of the individual cameras with respect to each other from one single individual image, comprising one individual image per camera. The test structures present, for example, in the two individual images are captured according to their position on the corresponding image sensor and the captured location coordinates (pixel information) of the corresponding test structures in the respective individual image are then compared with each other. The position of the, for example, two cameras relative to each other can be calculated from the present deviations. Based on the information captured in a single image, it is possible to perform a complete alignment of the cameras with respect to each other around all six axes. The apparatus according to aspects of the invention allows a particularly time-saving, simultaneously precise and thus very efficient and economic calibration and adjustment of the multi-camera module.

If the cameras of the multi-camera module are test samples with different or even unknown focal lengths, then an H pattern is preferably used to create the test structure. Based on the size of the imaging of the H pattern, it is possible to determine the imaging scale of the respective camera and to thus deduce the focal length from its optics. According to a further advantageous aspect of the invention, a "bow tie" pattern is used for an optimal subpixel alignment of the cameras.

Based on the position differences among the captured test structures, which are located at an infinite distance from the multi-camera module, it is possible to determine a tilting as well as a rotation of the cameras relative to each other. Based on the position differences among the captured test structures, which are located at a finite distance from the multi-camera module, a lateral position of the cameras relative to each other is set to the desired value. The cameras with respect to all six axes can be aligned in relation to each other by assessing both test structures.

It is further preferably provided that the patterns on the graticules or even the graticules themselves are arranged tilted by approximately 3° to 15° with respect to an optical axis of the collimator. It is thus also made possible to perform an MTF/SFR measurement on the virtual test structures, i.e. the imaging of the graticules, in addition to the previously described adjustment of the two cameras relative to each other. Thus, in addition to the alignment of the cameras relative to each other, their focal point can also be set.

The apparatus is advantageously further enhanced in that the processing unit is configured to capture the individual images of the picture simultaneously.

In other words, both cameras of the multi-camera module are triggered simultaneously, wherein both cameras simultaneously capture both the virtual test structures at a finite distance as well as the virtual test structures at an infinite distance.

According to an advantageous embodiment, it is provided that the optical arrangement comprises a first collimator and a second collimator, wherein the first collimator is configured to image the first graticule as the first virtual test structures at an infinite distance and wherein the second collimator is configured to image a second graticule as the second virtual test structures at a finite distance.

In this embodiment it is preferably provided that the first collimator, which images first virtual test structures at an infinite distance and at least one second collimator, which images second virtual test structures at a finite distance, are arranged on a common hemisphere, i.e. a dome. The use of two second collimators being arranged symmetrically to the first collimator is advantageously provided. A test structure created with the help of the two second collimators, each of which images a second virtual test structure at a finite distance, has a certain lateral expansion. In the case of a test structure with a larger lateral expansion, it is possible to perform a more precise adjustment.

Furthermore, the apparatus is further enhanced, in particular, in that the optical arrangement comprises a first collimator, which is configured to image the first graticule as the first virtual test structures at an infinite distance, wherein second real test structures are arranged at a finite distance from the multi-camera module.

Advantageously, only a single collimator is needed for the apparatus according to this exemplary embodiment. In order to provide a test structure at a finite distance, a real test structure, for example a card, a graticule illuminated from behind or the like, is applicable. Such an apparatus is particularly simple and cost-effective.

Furthermore, the apparatus is further enhanced, in particular, in that the optical arrangement comprises a bifocal collimator, which images a graticule as first virtual test structures at an infinite distance and images the graticule as second virtual test structures at a finite distance.

The bifocal collimator in the apparatus according to this embodiment is particularly compact.

It is further provided according to another embodiment that the optical arrangement comprises a collimator, wherein a first graticule and a second graticule are arranged at different distances from a focus of the collimator, in that the first virtual test structures and the second virtual test structures are created by the collimator.

This apparatus also only need one single collimator. It is structured even more simply compared to a bifocal collimator, whereby the apparatus is cost-effective.

According to another advantageous embodiment, the apparatus is further enhanced in that the first collimator for imaging the first virtual test structures is designed as an auto-collimator at an infinite distance, which is configured to align the multi-camera module using reference surfaces of the multi-camera module.

The use of an auto-collimator advantageously permits the alignment of the entire multi-camera module, for example using reference surfaces, which are located on the housing of the multi-camera module.

The object is further solved by the use of an apparatus for adjusting and/or calibrating a multi-camera module according to one or more of the previously named aspects according to the invention. The same or similar advantages as already explained with respect to the apparatus itself apply to the use. The same applies to advantageous enhancements and further developments.

The object is further solved by a method for adjusting and/or calibrating a multi-camera module having a plurality of cameras, the method comprising the following steps:

providing first virtual test structures at an infinite distance and second test structures at a finite distance, wherein the first test structures are provided in that a first graticule is imaged with a first collimator at an infinite distance, capturing a picture of the first and/or the second test structures with the multi-camera module, wherein a picture is captured with the multi-camera module, said picture comprising an individual image per camera, and wherein each individual image displays the first and/or the second test structures, analyzing the captured picture, wherein an alignment of the cameras of the multi-camera module relative to each other is calculated from the captured picture in that positions of the test structures in the individual image of a cam-era are compared with positions of the corresponding test structures in the individual image of another camera and deviations are calculated, and adjusting and/or calibrating the cameras of the multi-camera module relative to each other based on data relative to the alignment of the cameras of the multi-camera module.

The same or similar advantages as well as aspects for further development, as were already mentioned with respect to the apparatus for adjusting and/or calibrating the camera module, also apply to the method for adjusting and/or calibrating the multi-camera module, which is why corresponding repetitions are omitted.

The method is further enhanced, in particular, in that the individual images of the picture are captured simultaneously. Furthermore, the first and the second test structures are provided in particular simultaneously.

According to a further embodiment, the method is further enhanced in that the first virtual test structures are provided at an infinite distance by imaging a first graticule with a first collimator of the optical arrangement and the second test structures are provided as virtual test structures at a finite distance by imaging a second graticule with a second collimator of the optical arrangement.

In particular, the method is further enhanced in that the first virtual test structures are provided at an infinite distance by imaging a first graticule with a first collimator of the optical arrangement, the second test structures are provided as real test structures at a finite distance in that second real test structures are arranged at a finite distance from the multi-camera module.

According to another advantageous embodiment, the first virtual test structures are provided at an infinite distance and the second test structures are provided as virtual test structures at a finite distance in that a graticule is imaged as first virtual test structures at an infinite distance with a bifocal collimator of the optical arrangement and the graticule is imaged as second virtual test structures at a finite distance.

In particular, the method is also further enhanced in that the first virtual test structures are provided at an infinite distance and the second test structures are provided as virtual test structures at a finite distance in that a first graticule and a second graticule are arranged at different distances from a focus of the collimator.

In another advantageous embodiment, the multi-camera module is aligned based on reference surfaces of the multi-camera module with the first collimator for creating the first virtual test structures at an infinite distance, which is designed as an auto-collimator.

Further features of the invention will become apparent from the description of embodiments according to the invention together with the claims and the included drawings. Embodiments according to the invention can fulfill individual characteristics or a combination of several characteristics.

BRIEF DESCRIPTION OF THE DRAWINGS

The invention is described below, without restricting the general idea of the invention, based on exemplary embodiments in reference to the drawings, wherein we expressly refer to the drawings with regard to the disclosure of all details according to the invention that are not explained in greater detail in the text. The figures show the following.

In the drawings, the same or similar types of elements and/or parts are provided with the same reference numbers so that a re-introduction is omitted.

DETAILED DESCRIPTION OF THE INVENTION

Figure 1:
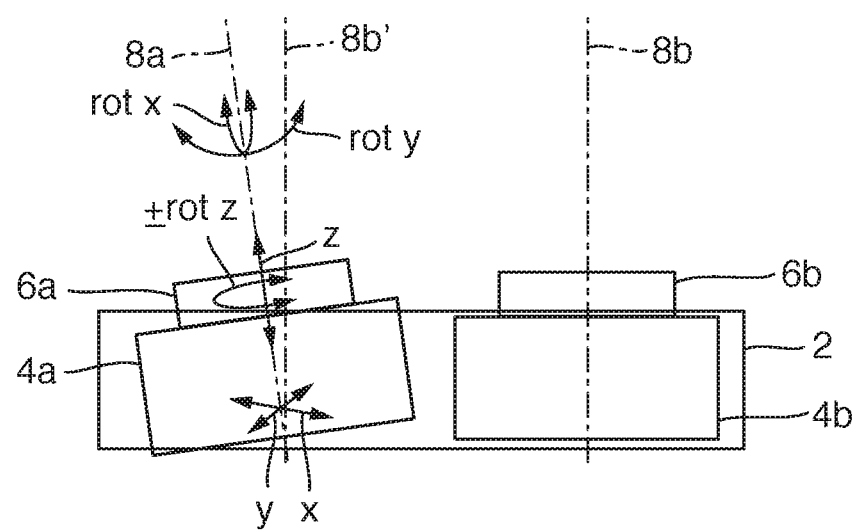
FIG. 1 a multi-camera module in a schematically simplified side view.

FIG. 1 shows in a schematic simplified side view a multi-camera module 2, which comprises for example two cameras, namely a first camera 4a and a second camera 4b. The following explanations apply mutatis mutandis to multi-camera modules 2, which comprise more than two cameras. The two cameras 4a, 4b shown as examples both include an image sensor (not shown), for ex-ample a CCD or CMOS sensor. Moreover, each of the cameras 4a, 4b includes an imaging optic 6a, 6b, wherein the imaging optic of the first camera 4a is designated the first imaging optic 6a and that of the second camera 4b is designated the second imaging optic 6b. The imaging optics 6a, 6b are, for example, objective lenses being manufactured of one or more lenses.

Furthermore, the multi-camera module 2 is used, for example, in medical technology in a 3D endoscope, in automobile technology as a distance stereo camera or in the field of multi-media as a 3D camera. The size and the constructive structure of the multi-camera module 2 and its cameras 4a, 4b, both with respect to the image sensor as well as in relation to the optical construction of the associated imaging optics 6a, 6b, thus varies greatly depending on the respective range of application.

Before the multi-camera module 2 can be used properly, it is necessary to align, i.e. to adjust and calibrate, both individual cameras 4a, 4b with respect to each other. FIG. 1 shows as an example the first camera 4a being tilted with respect to the second camera 4b. The second optical axis 8b of the second camera 4b shown by the dash-dot line is also represented in a parallel offset manner progressing through the center of the first camera 4a and is labeled there with 8b'. In FIG. 1, the first optical axis 8a of the first camera 4a deviates from the orientation of the second optical axis 8b.

In order to adjust the first camera 4a with respect to the second camera 4b, a total of six degrees of freedom should be set. These would first be the translatory degrees of freedom around which both cameras 4a, 4b can be shifted in one plane relative to each other. These degrees of freedom or respectively displacement axes are indicated schematically with intersecting double arrows and are labeled with x and y. Furthermore, the two cameras 4a, 4b can be tilted with respect to each other. A tilting around the x axis is labeled with a rot x; a tilting around the y axis is labeled with a rot y. The tilting movements are indicated with intersecting curved double arrows. Two rotational degrees of freedom are added to these total of four degrees of freedom, with respect to which the cameras under rotation can be arranged rotated to each other around their vertical or z axis. Such a twist is labeled with a +/− rot z and is represented by a curved double arrow. The prefix indicates the different direction of rotation of the potential twist. Twists with a different direction of rotation are respectively viewed as a degree of freedom.

Theoretically, there is another degree of freedom for the arrangement of the two cameras 4a, 4b relative to each other, namely a displacement in the z direction, i.e. at least approximately along their optical axes 8a or 8b, respectively. This displacement is labeled with a z and is shown in FIG. 1 with a corresponding double arrow progressing along the first optical axis 8a for the sake of completeness. However, this degree of freedom is not calibrated and adjusted. First, the calibration in the z direction is less critical than in the other degrees of freedom; second, it is assumed that the first and second camera 4a, 4b are accommodated sufficiently accurately at the same height in the housing of the multi-camera module 2.

An apparatus and a method for adjusting a multi-camera module 2, as explained as an example and schematically in FIG. 1, is explained below, wherein the following six degrees of freedom are set: x, y, rot x, rot y and +/− rot z.

An apparatus 10 for adjusting and calibrating a multi-camera module 2 is shown in various exemplary embodiments respectively in a schematically simplified side view in FIGS. 6 and 9 to 11. The apparatus 10 comprises respectively an optical arrangement for simultaneously creating first virtual test structures at an infinite distance and second (depending on the exemplary embodiment) virtual or real test structures at a finite distance. Before going into detail about the apparatuses 10 according to the different exemplary embodiments, the creation and significance of the test structures with respect to the adjustment and calibration of the individual cameras 4a, 4b of the multi-camera module 2 should be explained in principle.

Figure 2:
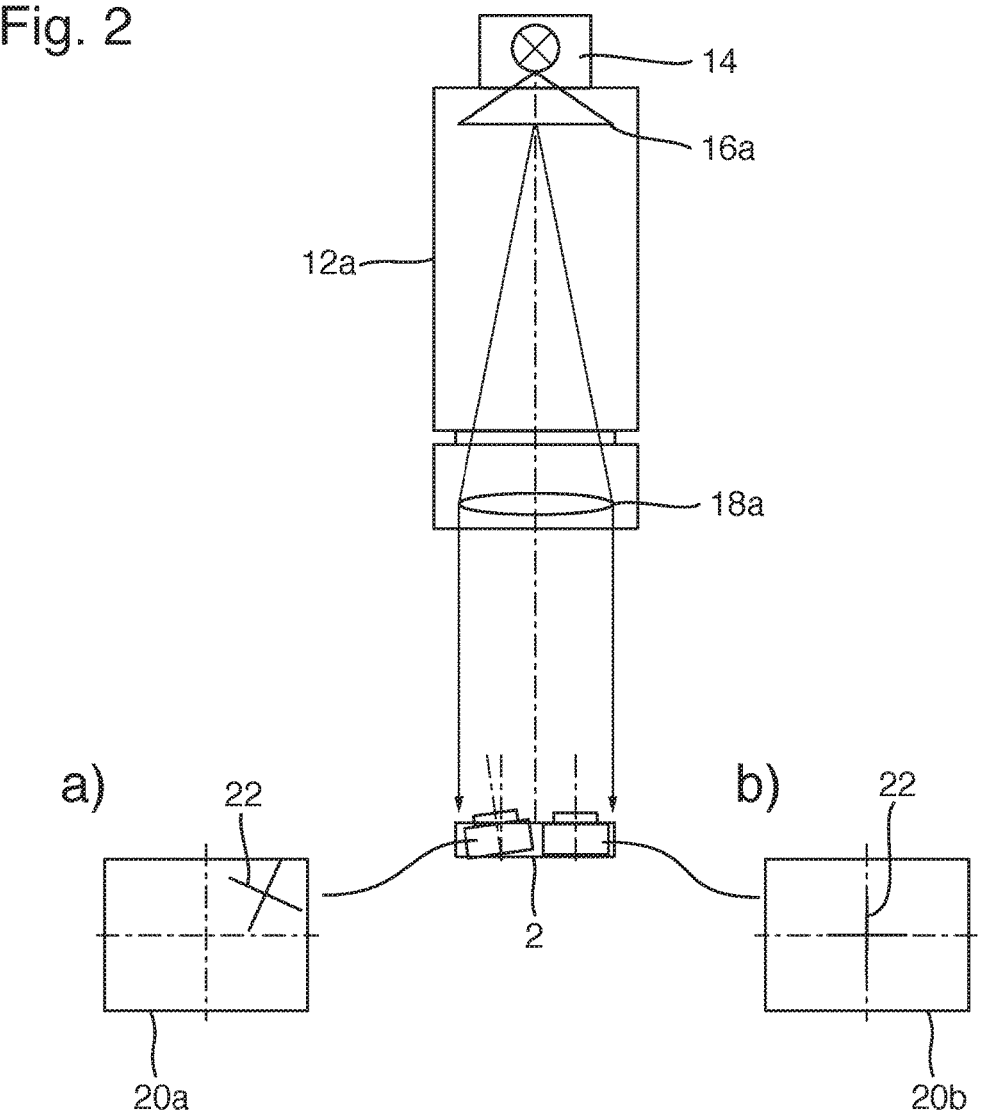
FIG. 2 a collimator for the imaging of a test structure at an infinite distance as part of an apparatus for adjusting and/or calibrating a multi-camera module in a schematically simplified side view, wherein a) or respectively b) each show a schematically shown individual image captured by a camera of this apparatus.

For this, FIG. 2 shows a first collimator 12a in a schematically simplified side view, which is configured to create a first virtual test structure at an infinite distance. For this, the first collimator 12a, which is also called an infinite collimator, comprises an illumination 14, with which a first graticule 16a is illuminated from the rear side. A first objective lens 18a is thus positioned such that the first graticule 16a is imaged at infinity.

The first collimator 12a illuminates the multi-camera module 2. Its first and second camera 4a, 4b capture respectively the individual images shown schematically and labeled with a) or respectively b), i.e. a first individual image 20a and a second individual image 20b. The two individual images 20a, 20b together form a picture captured by the multi-camera module 2. The two individual images 20a, 20b each comprise an imaging of the first virtual test structure 22 created by the first collimator 12a. Based on the tilting of the two cameras 4a, 4b relative to each other (also see FIG. 1), the first virtual test structure 22 is located in the two individual images 20a, 20b at different positions.

Figure 3:
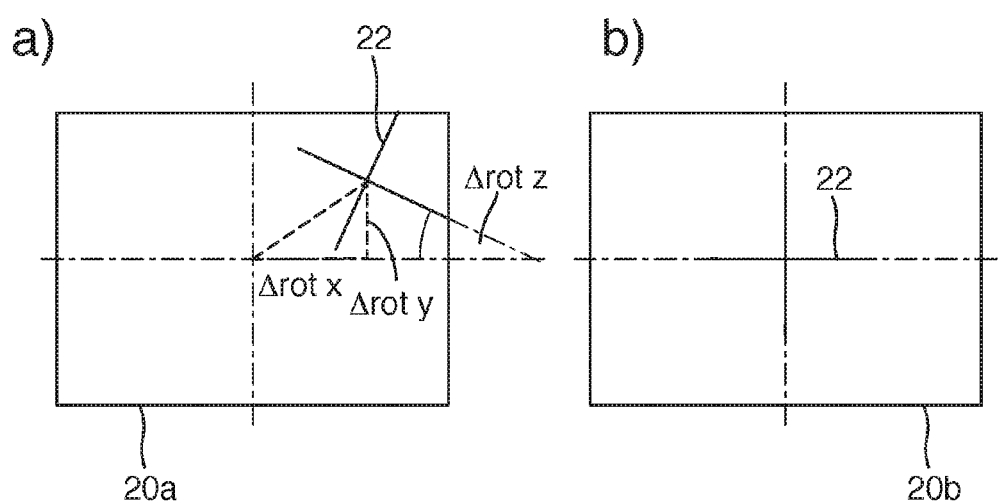
FIG. 3 the individual images from FIG. 2 in an enlarged representation.

FIG. 3 shows the individual images 20a, 20b known from FIG. 2 in an enlarged representation. It is assumed, for example, that the second camera 4b, which captures the second individual image 20b, is aligned correctly. For this reason, the first virtual test structure 22 is located exactly in the center in the second individual image 20b. In the first individual image 20a, which was taken with the tilted first camera 4a, the virtual test structure 22 is shifted out of the center. Its deviation from the center is labeled with Δ rot x and Δ rot y. The displacement labeled with Δ rot x results from a tilting of the first camera 4a around the directional axis x (labeled with x in FIG. 1). The deviation of the center of the imaging of the first virtual test structure 22 in the first individual image 20a by the amount labeled with Δ rot y results from the tilting of the first camera 4a about the directional axis labeled with y in FIG. 1. The first virtual test structure 22 is not only shifted out of the center in the first individual image 20a, but is also rotated by an angle with respect to the first virtual test structure 22 present in the second individual image 20b. This angle of rotation Δ rot z corresponds with a rotation of the first camera 4a with respect to the second camera 4b in the direction labeled with +/− rot z in FIG. 1.

Figure 4:
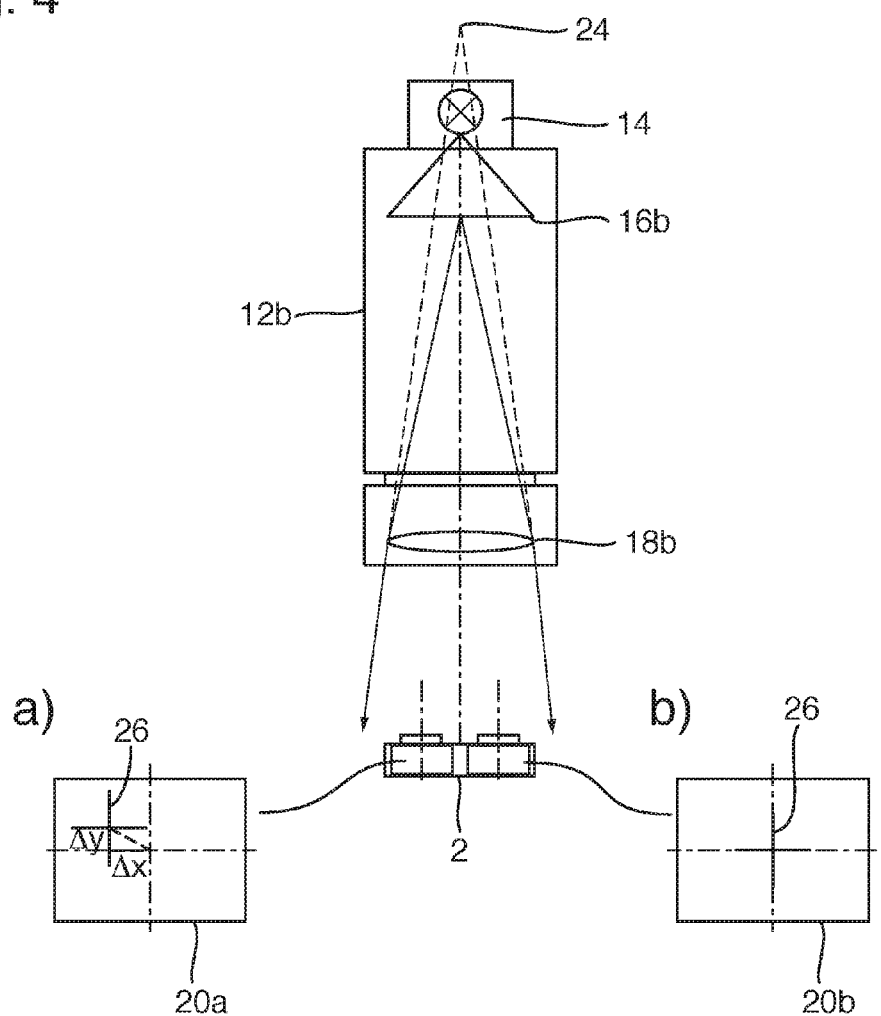
FIG. 4 a collimator for the imaging of a test structure at a finite distance as part of an apparatus for adjusting and/or calibrating a multi-camera module in a schematically simplified side view, wherein a) or respectively b) each show a schematically shown individual image captured by a camera of this apparatus, FIG. 5 the individual images from FIG. 4 in an enlarged representation.

The four degrees of freedom rot x, rot y, and +/− rot z (see FIG. 1) can be determined from the values of Δ rot x, Δ rot y and Δ rot z. In order to also determine the remaining degrees of freedom, the optical arrangement comprises, in addition to the first collimator 12a, which delivers an image of the first graticule 16a into infinity, a second collimator 12b, which delivers an image at a finite distance and is shown in a schematically simplified side view in FIG. 4.

The second collimator 12b also comprises an illumination 14, which illuminates a second graticule 16b from the rear side. The second objective lens 18b images the second graticule 16b to a finite distance. The virtual collimator image 24 is indicated by the dashed line, which images for the multi-camera module 2 a real image at a finite distance. The first and second camera 4a, 4b of the multi-camera module 2 in FIG. 4 should already be corrected, for example, with respect to the degrees of freedom rot x, rot y and +/− rot z described in connection with FIGS. 2 and 3. The two degrees of freedom x and y thus remain. An individual image 20a, 20b captured by the first and second camera 4a, 4b, respectively, is labeled with a) and b) in FIG. 4 and is shown in a schematically simplified manner. The two individual images 20a, 20b each comprise a second virtual test structure 26.

In FIGS. 5a and 5b, respectively, the two individual images 20a, 20b are shown enlarged. The second virtual test structure 26 is shifted out of the center in the first individual image 20a. The displacement Δx thereby corresponds to a displacement in the x direction (see FIG. 1). The displacement of the second virtual test structure 26 by the amount Δy corresponds to a displacement of the first camera 4a in the y direction.

Figure 5:
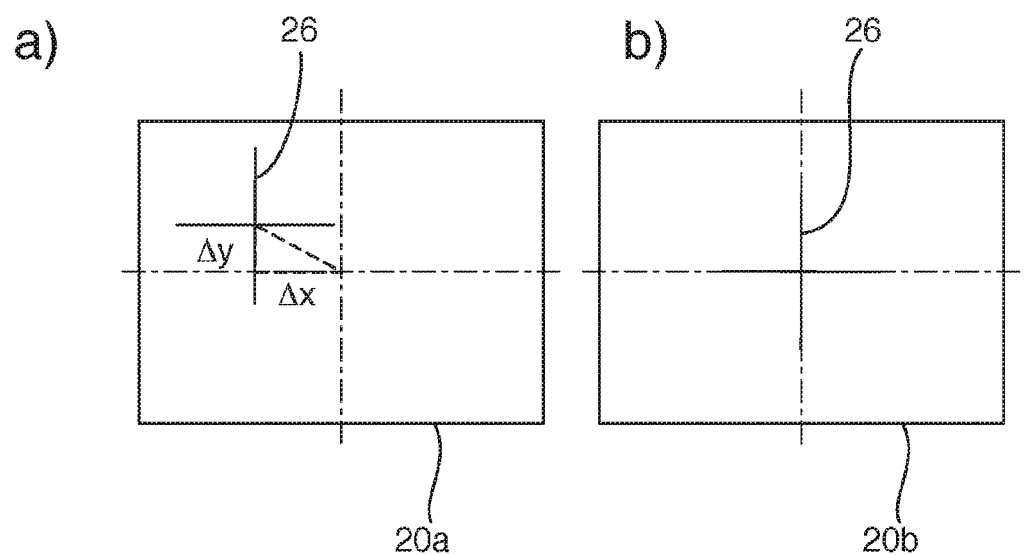

All six degrees of freedom x, y, rot x, rot y and +/− rot z of the first and second camera 4a, 4b can be determined relative to each other from the positions of the first virtual test structures 22 in the first and second individual image 20a, 20b (FIG. 3) and the position of the second virtual test structures 26 in the first and second individual image 20a, 20b (FIG. 5). The optical arrangement of the apparatus 10 is configured to project the first and second test structure 22, 26 simultaneously onto the multi-camera module 2 so that respectively the first virtual test structure 22 and the second virtual test structure 26 are present in the individual images 20a, 20b captured by the individual cameras 4a, 4b of the multi-camera module 2 deviating from the representations in FIGS. 3 and 5. Thus, the complete orientation of the first and second camera 4a, 4b of the multi-camera module 2 relative to each other can be obtained from one single picture of the multi-camera module 2, which comprises the first and second individual image 20a, 20b. Based on the data captured with one single picture, it is also possible to align both cameras 4a, 4b relative to each other with respect to their previously named six degrees of freedom.

Figure 6:
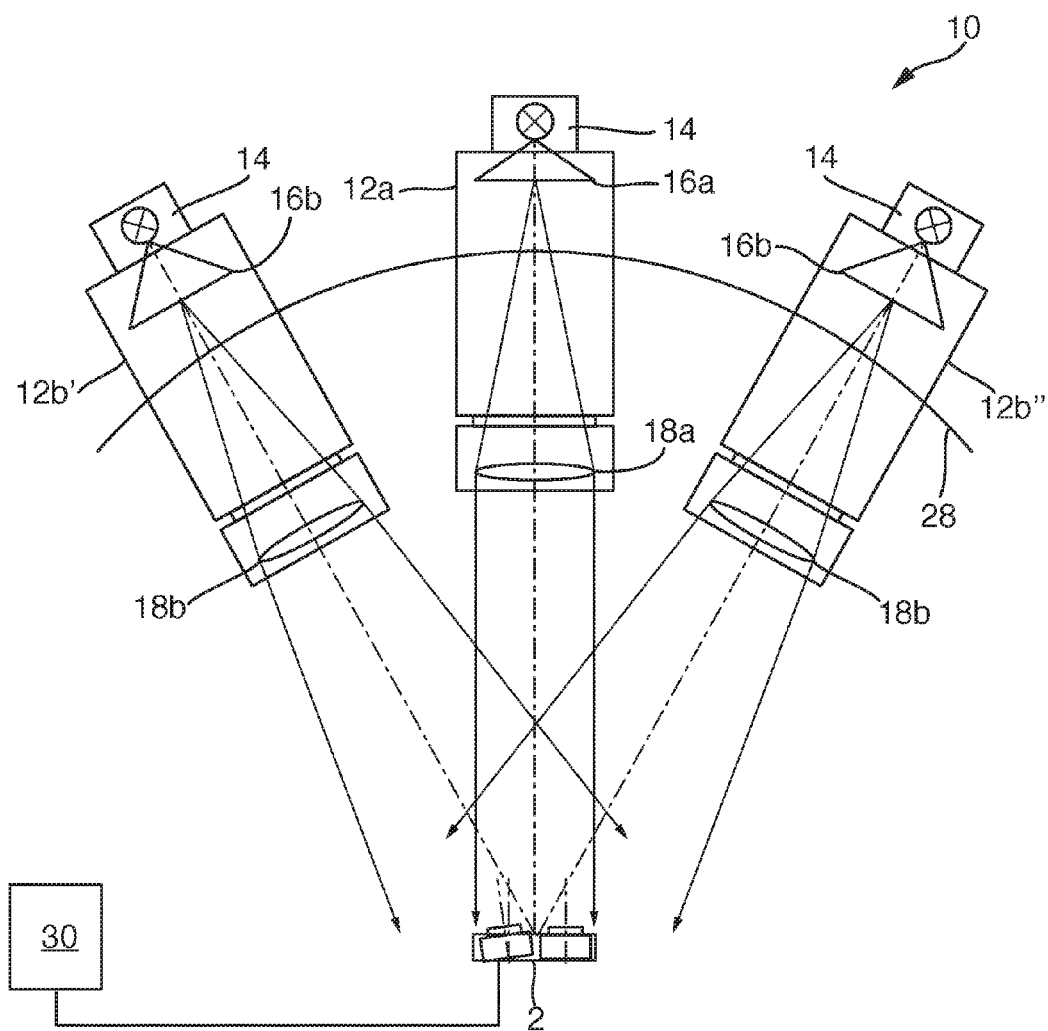
FIG. 6 an apparatus for adjusting and/or calibrating a multi-camera module.

FIG. 6 shows an apparatus 10 for adjusting and calibrating a multi-camera module 2 according to an exemplary embodiment. The apparatus 10 comprises a first collimator 12a, which images a first virtual test structure at an infinite distance. The first collimator 12a is structured as described in connection with FIG. 2. Moreover, the apparatus 10 comprises two second collimators, 12b' and 12b", each of which represent a second virtual test structure to a finite distance. The second collimators, 12b' and 12b", are respectively structured as described in connection with FIG. 4.

The first collimator 12a and the two second collimators 12b' and 12b" together form an optical arrangement for creating first and second virtual test structures, which are present at an infinite distance or respectively at a finite distance. The first collimator 12a and the two second collimators 12b' and 12b" are arranged on a common sphere 28, also called a dome. Moreover, the apparatus 10 comprises a processing unit 30, which is for example a PC, a workstation or the like. The processing unit 30 serves to analyze a picture of the first and second test structures captured with the multi-camera module 2, which were created with the first collimator 12a and with the two second collimators 12b' and 12b". The first and second test structures are created simultaneously or in succession temporally. The processing unit 30 is configured to calculate an alignment of both cameras 4a, 4b of the multi-camera module 2 relative to each other from the captured picture. The picture captured with the multi-camera module 2 comprises one individual image 20a, 20b per camera 4a, 4b. Each individual image 20a, 20b comprises an imaging of the first and/or the second test structures 22, 26 depending on whether the test structures 22, 26 are created simultaneously or in succession. The processing unit 30 is also configured to calculate an alignment of the cameras 4a, 4b relative to each other in that positions of the test structures 22, 26 in the individual image 20a, 20b of a camera 4a, 4b are compared with positions of the corresponding test structures 22, 26 in the individual image 20a, 20b of another camera 4a, 4b and deviations are calculated.

Furthermore, the apparatus 10 comprises an adjusting and calibrating unit (not shown), which is configured to align these cameras 4a, 4b relative to each other based on data concerning the alignment of the cameras 4a, 4b of the multi-camera module 2 and to thus adjust and calibrate the multi-camera module 2. For this, the adjusting and calibrating unit comprises, for example, suitable actuators. Alternatively, actuators present in the multi-camera module 2 are used.

It is provided, in particular, that the processing unit 30 is configured to capture the individual images 20a, 20b of the picture simultaneously.

Figure 7:
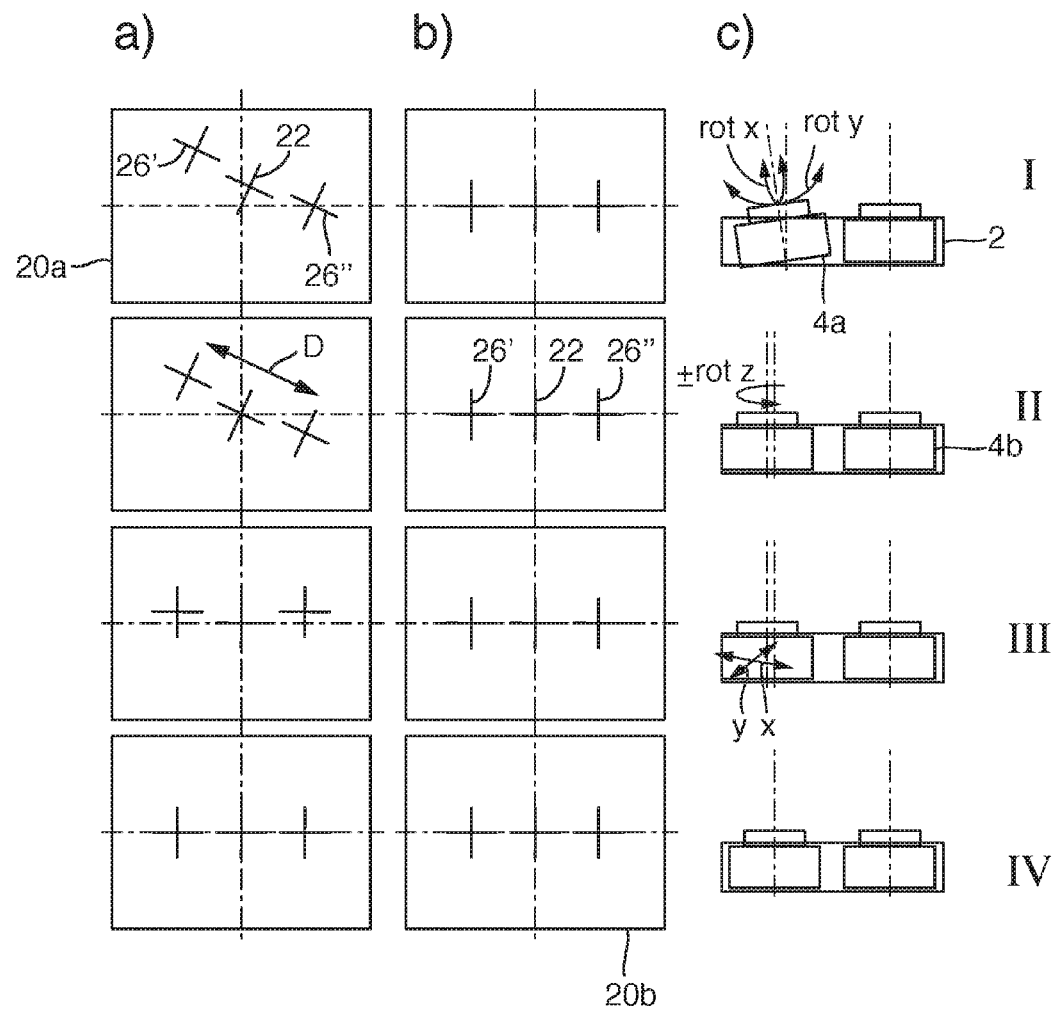
FIG. 7 individual states during the adjustment and/or calibration of both cameras of a multi-camera module, wherein column a) and b) each show individual images of the cameras of this multi-camera module and column c) shows schematically simplified side views of the multi-camera module.

FIG. 7 shows in a schematically simplified representation a series of first individual images 20a, which were taken with the first camera 4a (column a)). Column b) shows a series of second individual images 20b, which were taken with the second camera 4b. For reasons of clarity, only a few of the images 20a, 20b are provided with reference numbers. For example, the first and second image 20a, 20b shown in the first line concern individual images 20a, 20b, as they were taken by the first and second camera 4a, 4b of the multi-camera module 2, before it is adjusted in the apparatus 10 shown in FIG. 6. It is again only assumed, for example, that the second camera 4b has already been aligned. Each of the individual images 20a, 20b comprises a first virtual test structure 22 and two second virtual test structures 26', 26". Again for reasons of clarity, the first and second virtual test structure 22, 26', 26" are provided with reference numbers only in some of the individual images 20a, 20b. The second virtual test structure 26' is created, for example, by the second collimator 12b' of the apparatus 10 shown in FIG. 6. The second virtual test structure 26" is created with the second collimator 12b". The first collimator 12a creates the first virtual test structure 22. The first camera 4a is maladjusted with respect to the second camera 4b in all six degrees of freedom. Column c) in FIG. 7 shows, for example, the multi-camera module 2, wherein the adjustment of the corresponding degree of freedom is explained respectively in the associated line. For reasons of clarity, only some of the shown multi-camera modules 2 are provided with reference numbers.

The tilting of the first camera 4a with respect to the second camera 4b about the x or respectively y axis is corrected in the first line (labeled with I.). Analogous to the explanations in connection with FIG. 3, the first virtual test structure 22 in the first individual image 20a is examined with respect to its deviation by the first virtual test structure 22 in the second individual image 20b. This corresponds with the deviation of the first virtual test structure 22 from the origin in the first individual image 20a. The distance from the center of the first virtual test structure 22 on the abscissa thereby corresponds with the correction of the tilting rot x, the distance on the ordinate corresponds with the correction of rot y. If these corrections are performed in a first step, the representation results in the second line (labeled with II.). The first virtual test structure 22 is now located in the center of the first individual image 20a. A correction of the rotation of the first camera 4a with respect to the second camera 4b then takes place. The correction of the degree of freedom rot z is optionally performed based on the first virtual test structure 22 or based on the second virtual test structures 26', 26". In this connection, it is advantageous that the second virtual test structures 26', 26" have a distance D from each other. The determination of the tilt angle Δ rot z (see FIG. 3) can take place at a higher accuracy at a certain size of the distance D. After the rotation of the first camera 4a with respect to the second camera 4b of the multi-camera module 2 has taken place, the representation results in the third line of FIG. 7 (labeled with III.). Now only the displacement of the two cameras 4a, 4b relative to each other is to be determined and corrected. The displacement is corrected based on the second virtual test structure 26. For example, only a displacement Δy (see FIG. 5) is present. This is corrected and the representation in the fourth line of FIG. 7 results (labeled with IV.)

The method described in connection with FIG. 7 for aligning the first camera 4a with respect to the second camera 4b was only explained in the individual consecutive steps for reasons of better understandability. Actually, the method is not performed iteratively by the apparatus 10 since all information with respect to the alignment of all six degrees of freedom can already be obtained from a comparison of the first individual image 20a (shown in line I.) with the second individual image 20b in this line. Since it is not an iterative method, it works particularly fast and efficiently.

Figure 8:
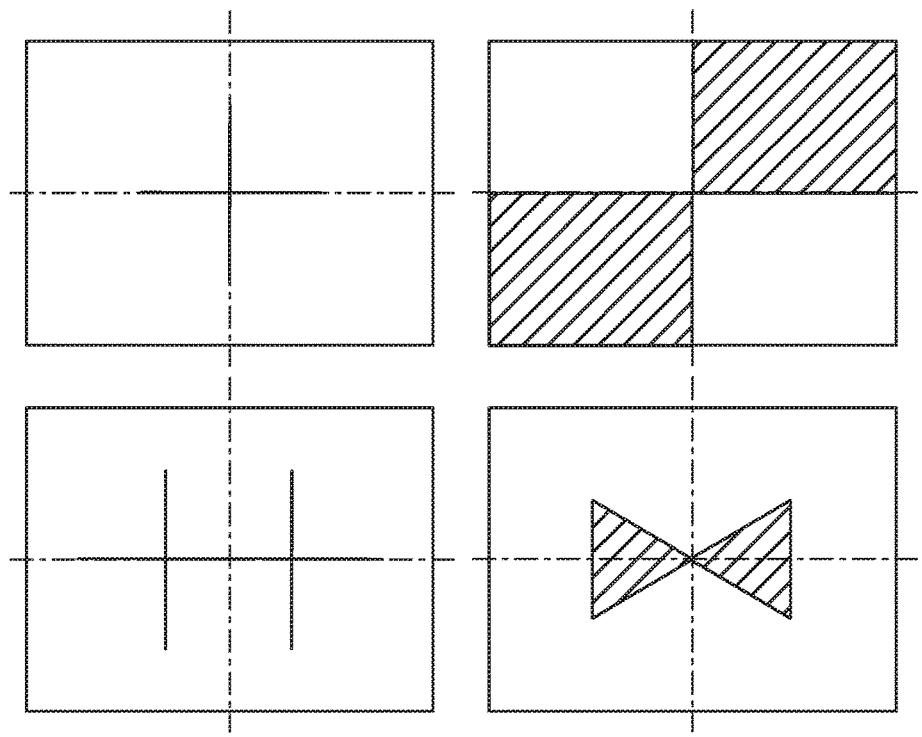
FIG. 8 different patterns for generating virtual and real test structures.

FIG. 8 shows different patterns, as they can be used on the first and/or second graticule 16a, 16b. Only as an example, a cross is always shown in the other figures. The test structures can be aligned rotated, for example, by 3°-15° to the pixel grid of the camera(s) 4a, 4b in order to achieve an advantageous measurement of the MTF. The H structures, as shown on the bottom left, or patterns consisting of several crosses, as shown on the bottom right, are particularly suitable when the imaging scale of the first and second camera 4a, 4b is different and is, in particular, not known. This can be the case when different imaging optics 6a, 6b are used, the focal lengths of which are not known. In such a case, before a corresponding alignment of the cameras 4a, 4b with respect to each other takes place, the imaging scale is first determined and, if applicable, the individual images to be compared with each other are correspondingly scaled. A bow tie structure, as shown in the middle of the bottom line, is suitable, in particular, in order to perform an adjustment with subpixel precision. The shown patterns are not only suitable as virtual test patterns but also as real test patterns.

Figure 9:
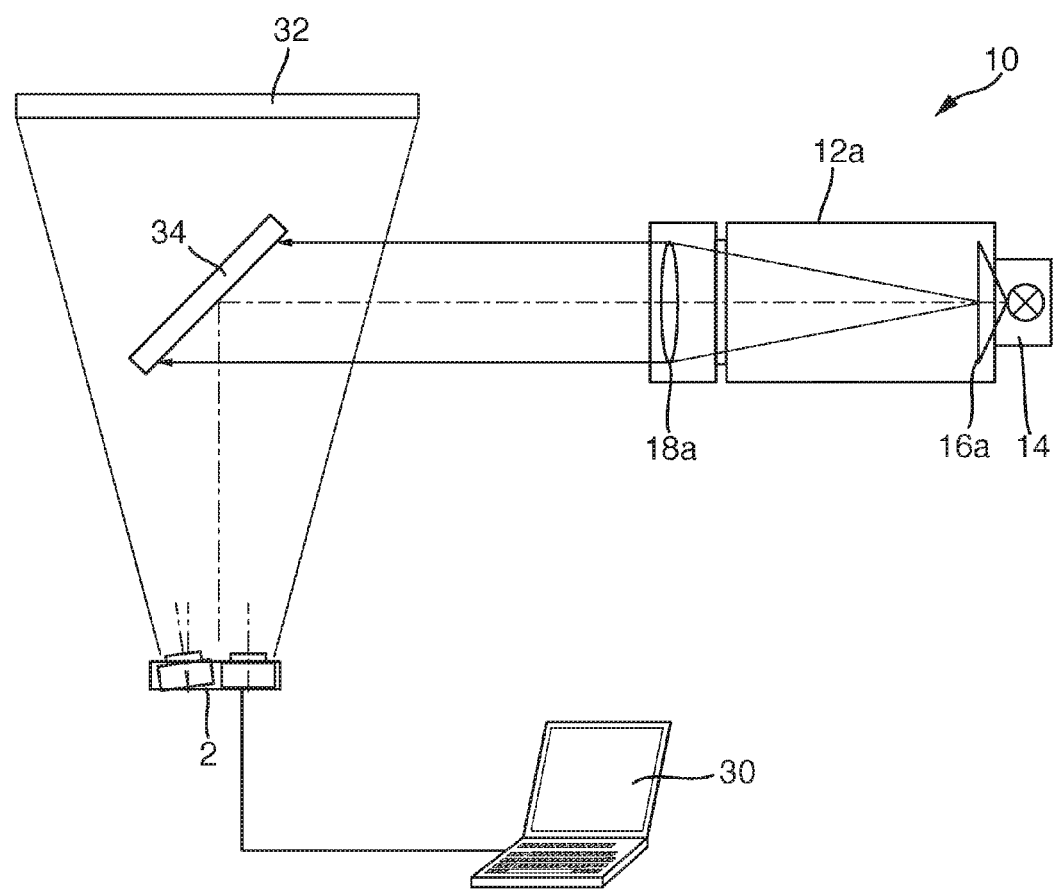
FIGS. 9-11 other apparatuses for adjusting and/or calibrating a multi-camera module, each in a schematically simplified side view.

FIG. 9 shows another exemplary embodiment of an apparatus 10 for adjusting and calibrating a multi-camera module 2. The apparatus 10 comprises a first collimator 12a, which is configured as described in connection with FIG. 2.

Furthermore, the apparatus 10 comprises a real test structure 32, for example a card or a background-illuminated plate, on which, for example, one of the pat-terns shown in FIG. 8 is present. The real test structure 32 fulfills the same function as the second virtual test structure 26 in the exemplary embodiment shown in FIG. 6. It is arranged at a finite distance from the multi-camera module 2. The imaging of the first collimator 12a in the direction of the multi-camera module 2 takes place with the help of a deflection mirror 34, which is in particular transparent. Furthermore, the apparatus 10 comprises a processing unit 30, which is for example a PC. The apparatus shown in FIG. 9 is also suitable for creating a test structure at a finite and a test structure at an infinite distance, which are captured simultaneously with the two cameras 4a, 4b of the multi-camera module 2. An alignment of the individual cameras 4a, 4b of the multi-camera module 2 relative to each other is then performed as was previously described.

Figure 10:
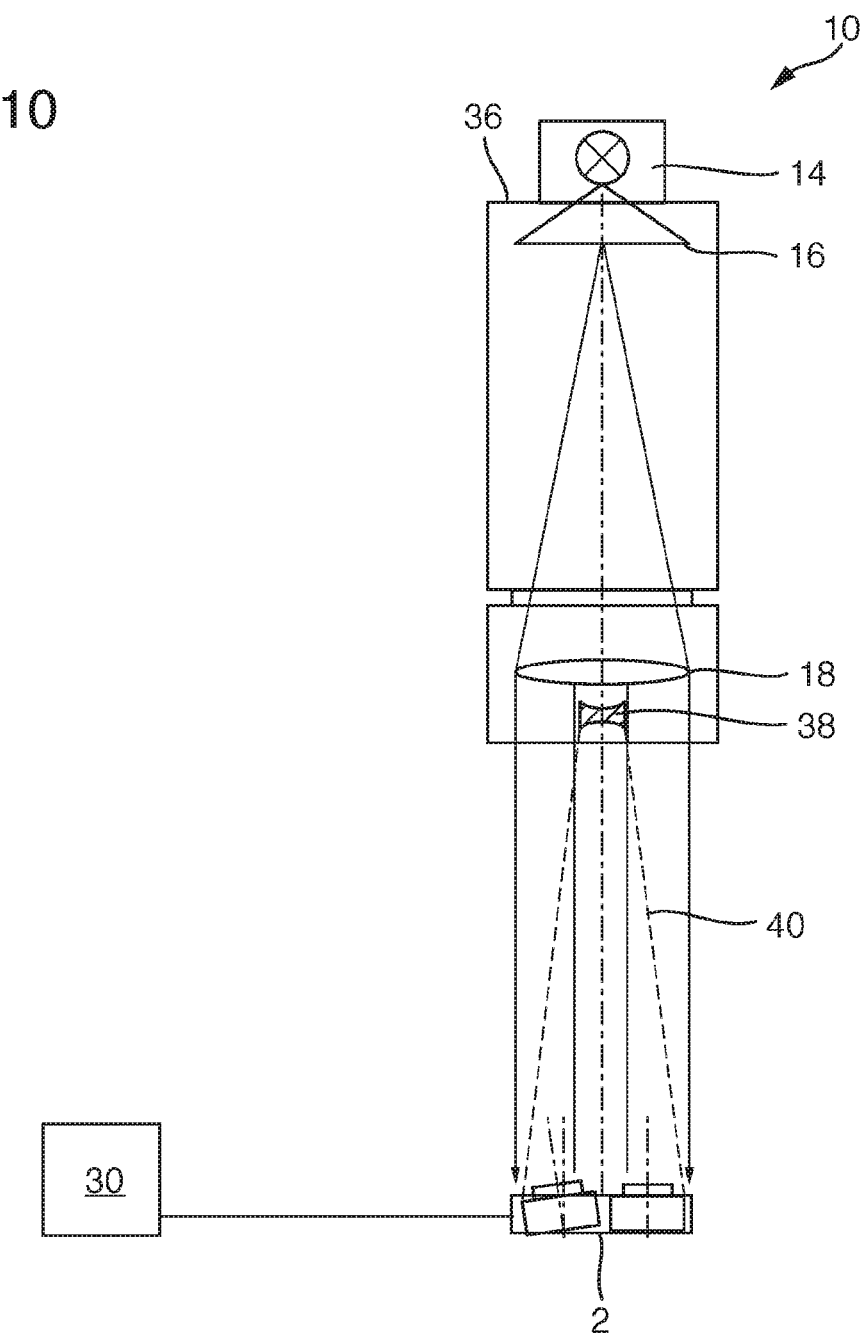

FIG. 10 shows another apparatus 10 for adjusting and/or calibrating a multi-camera module 2 according to an exemplary embodiment. The apparatus 10 comprises a bifocal collimator 36, which provides simultaneously the function of a finite collimator and that of an infinite collimator. The bifocal collimator 36 comprises a graticule 16, which is imaged with the help of the lens 18 at an infinite distance. A negative lens 38 is arranged below the lens 18, which ensures that the light bundle penetrating the lens 18 centrally results in an imaging of the graticule 16 at a finite distance. This is the shown light bundle 40 indicated by the dashed line, which emanates from the negative lens 38. A bi-focal collimator lens, which is manufactured from the lens 18 and the negative lens 38, is thus used in the exemplary embodiment. This bifocal collimator lens delivers both collimated light (similar to an infinite collimator) as well as diver-gent light (similar to a finite collimator). One example of this is the shown combination of a positive lens 18 for the collimation and a downstream negative lens 38 for the creation of divergent light. If the negative lens 38 is designed so that its diameter is less than the distance between the two cameras 4a, 4b, then collimated as well as divergent light makes its way simultaneously to the cam-eras 4a, 4b.

The apparatus 10 also comprises, like the other apparatuses, a processing unit 30, the function of which was already sufficiently explained. The apparatus 10 according to the exemplary embodiment shown in FIG. 10 is characterized by a particularly compact structure.

Figure 11:
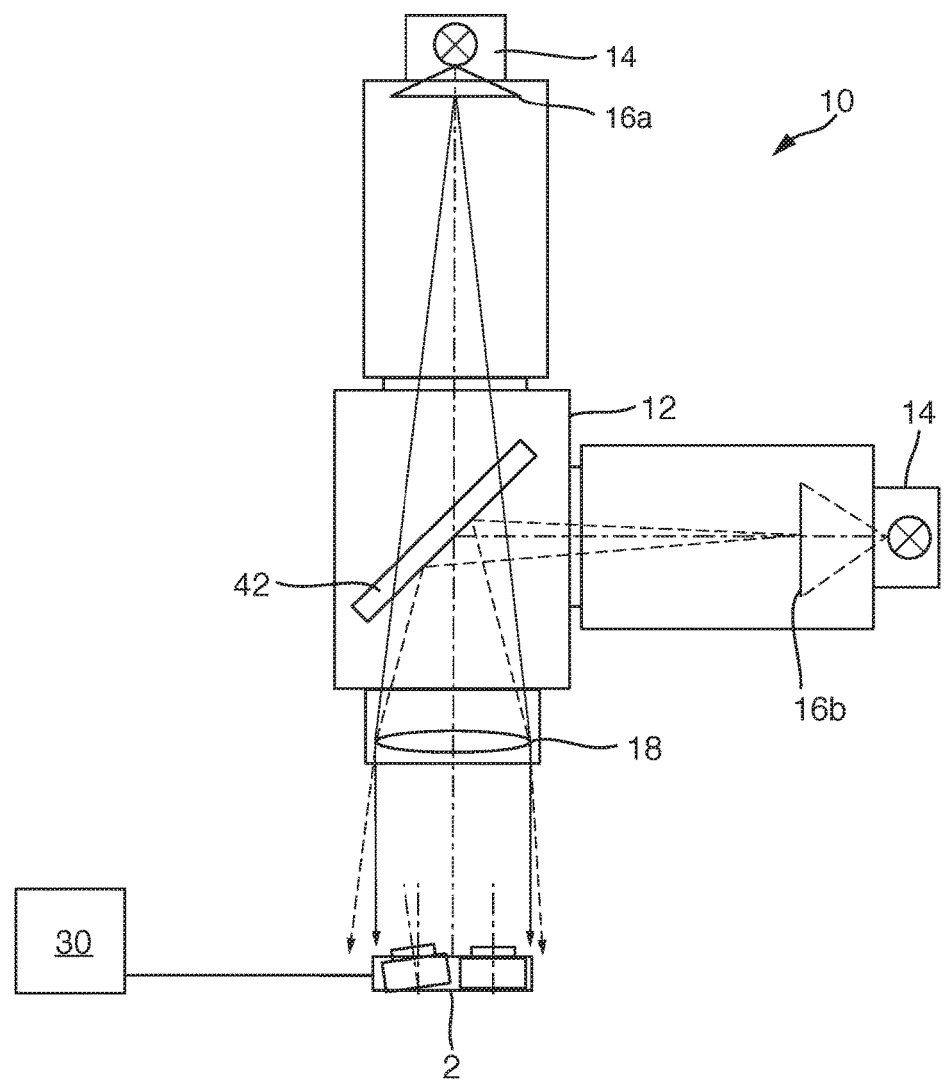

FIG. 11 shows another apparatus 10 according to an exemplary embodiment. The optical arrangement comprises a collimator 12, wherein a first graticule 16a and a second graticule 16b are arranged at a different distance from a focus of the collimator 12. The first graticule 16a is located at least approximately in the focus of the collimator 12. Its pattern is thus imaged to infinity. In contrast, the second graticule 16b is shifted out of the focus of the collimator 12 and lies slightly within the focal length of the lens 18. Its pattern is thus shown at a finite distance. The two images are combined with the help of a beam splitter 42 so that both the first and the second virtual test structure 22, 26 are again captured by the multi-camera module 2. The apparatus 10 as shown in FIG. 11 further comprises an already described processing unit 30.

It is further provided, in particular, for all previously named exemplary embodiments that the first collimator 12a is designed as an auto-collimator to create the first virtual test structures 22 at an infinite distance. For this, it is configured to align the multi-camera module 2 based on reference surfaces of the multi-camera module 2.

The previously described apparatuses 10 are used, in particular, for adjusting and/or calibrating a multi-camera module 2. This advantageously relates to all exemplary embodiments.

The adjustment and calibration can be performed together or only one of the procedures is performed. If only a calibration is performed, the second cameras are not actively adjusted, but rather the deviations are only determined metro-logically. The data can then be used to correct numerically, for example, the second camera images. This can be advantageous if, for example, the adjustment of the individual cameras is not possible separately from one another, for example, if both objective lenses as well as camera sensors are arranged respectively on separate wafers.

Furthermore, differing from the representations in the figures, an adjustment and calibration only of the imaging optics 6a, 6b and/or of the image sensors (not shown) of the cameras 4a, 4b and not of all cameras 4a, 4b is provided. This relates, in particular, to exemplary embodiments, in which optionally the imaging optics 6a, 6b or the image sensors are combined structurally. For example, they are permanently connected to each other or are received in a common housing. Concerning the image sensors, it is provided in this connection, in particular, that they are arranged on a common printed circuit board or even on a same die. In an extreme example, it is a large sensor, which is illuminated with two separate imaging optics. For the described apparatuses 10, the adjustment of a multi-camera module 2 with only two cameras 4a, 4b was only described as an example. The apparatuses 10 are also provided for the adjustment of multi-camera modules 2 with more than two cameras. For the adjustment of such a module, a comparison of several first individual images of different cameras with the reference individual image takes place instead of a comparison of a first individual image 20a with a second reference individual image 20b.

All named features, including those taken from the drawings alone and individual features, which are disclosed in combination with other features, are considered alone and in combination as essential for the invention. Embodiments according to the invention can be fulfilled through individual features or a combination of several features. In the context of the invention, features which are designated with "in particular" or "preferably" are to be understood as optional features.

REFERENCE NUMBER LIST

2 Multi-camera module
4a First camera
4b Second camera
6a First imaging optic
6b Second imaging optic
8a First optical axis
8b, 8b' Second optical axis
10 Apparatus for adjusting and calibrating
12 Collimator
12a First collimator
12b, 12b', 12b" Second collimator
14 Illumination
16 Graticule
16a First graticule
16b Second graticule
18a First lens
18b Second lens
20a First individual image
20b Second individual image
22 First virtual test structure
24 Virtual collimator image
26 Second virtual test structure
28 Sphere
30 Processing unit
32 Real test structure
34 Deflection mirror
36 Bifocal collimator
38 Negative lens
40 Light bundle/Limiting ray of the negative lens
42 Beam splitter
D Distance

What is claimed is:

1. An apparatus for adjusting and/or calibrating a multi-camera module having a plurality of cameras, the apparatus comprising:
an optical arrangement for creating first virtual test structures at an infinite distance and second test structures at a finite distance, wherein the optical arrangement comprises at least one collimator, which is configured to create the first virtual test structures at the infinite distance by imaging of a first graticule, and wherein the test structures are simultaneously detectable with the cameras of the multi-camera module;
a processing unit for evaluating a picture of the first and second test structures captured with the multi-camera module, wherein the processing unit is configured to calculate an alignment of the cameras of the multi-camera module relative to each other from the captured picture, wherein the picture captured with the multi-camera module comprises an individual image per camera, and wherein each individual image displays the first and/or the second test structures and the processing unit is further configured to calculate an alignment of the cameras relative to each other by comparing positions of the test structures in an individual image of a camera with positions of the corresponding test structures in an individual image of a further camera and calculating deviations; and
an adjusting and/or calibrating unit, which is configured to align said cameras relative to each other based on data relating to the alignment of the cameras of the multi-camera module and thereby adjust and/or calibrate the multi-camera module.

2. The apparatus according to claim 1, wherein the processing unit is configured to capture the individual images of the picture simultaneously.

3. The apparatus according to claim 1, wherein the optical arrangement comprises a first collimator and a second collimator, wherein the first collimator is configured to image the first graticule as the first virtual test structures at an infinite distance and wherein the second collimator is configured to image a second graticule as second virtual test structures at a finite distance.

4. The apparatus according to claim 1, wherein the optical arrangement comprises a first collimator, which is configured to image the first graticule as the first virtual test structures at the infinite distance, and wherein second real test structures are arranged at the finite distance from the multi-camera module.

5. The apparatus according to claim 1, wherein the optical arrangement comprises a bifocal collimator, which images a graticule as the first virtual test structures at the infinite distance and images the graticule as second virtual test structures at the finite distance.

6. The apparatus according to claim 1, wherein the optical arrangement comprises a collimator, wherein a first graticule and a second graticule are arranged at different distances from a focus of the collimator, and wherein the first virtual test structures and the second virtual test structures are created by the collimator.

7. The apparatus according to claim 1, wherein the at least one collimator for creating the first virtual test structures is designed as an auto-collimator at an infinite distance, which is configured to align the multi-camera module using reference surfaces of the multi-camera module.

8. A method for adjusting and/or calibrating a multi-camera module having a plurality of cameras, the method comprising:
providing first virtual test structures at an infinite distance and second test structures at a finite distance, wherein the first test structures are provided such that a first graticule is imaged with a first collimator at the infinite distance;
capturing a picture of the first and/or the second test structures with the multi-camera module, wherein the picture is captured with the multi-camera module, said picture comprises an individual image per camera, and wherein each individual image displays the first and/or the second test structures;
analyzing the captured picture, wherein an alignment of the cameras of the multi-camera module relative to each other is calculated from the captured picture by comparing positions of the test structures in the individual image of a camera with positions of the corresponding test structures in the individual image of another camera and calculating deviations; and
adjusting and/or calibrating the cameras of the multi-camera module relative to each other based on data relative to the alignment of the cameras of the multi-camera module.

9. The method according to claim 8, wherein the individual images of the picture are captured simultaneously.

10. The method according to claim 8, wherein the first virtual test structures are provided at the infinite distance by imaging a first graticule with a first collimator of the optical arrangement and the second test structures are provided as virtual test structures at the finite distance by imaging a second graticule with a second collimator of the optical arrangement.

11. The method according to claim 8, wherein the first virtual test structures are provided at an infinite distance by imaging a first graticule with a first collimator of the optical arrangement, the second test structures are provided as real test structures at the finite distance in that the second real test structures are arranged at the finite distance from the multi-camera module.

12. The method according to claim 8, wherein the first virtual test structures are provided at the infinite distance and the second test structures are provided as virtual test structures at the finite distance, wherein a graticule is imaged as the first virtual test structures at the infinite distance with a bifocal collimator of the optical arrangement and the graticule is imaged as second virtual test structures at the finite distance.

13. The method according to claim 8, wherein the first virtual test structures are provided at the infinite distance and the second test structures are provided as virtual test structures at the finite distance, and wherein a first graticule and a second graticule are arranged at different distances from a focus of the collimator.

14. The method according to one of claim 8, wherein the multi-camera module is aligned based on reference surfaces of the multi-camera module with the first collimator for creating the first virtual test structures at the infinite distance, which is an auto-collimator.

* * * * *